United States Patent [19]

Loyd et al.

[11] Patent Number: 5,033,453

[45] Date of Patent: Jul. 23, 1991

[54] OVERFLOW COOKING POT ASSEMBLY

[76] Inventors: Dennis G. Loyd; Lois B. Loyd, both of R.R. #1, Box 97, Downs, Kans. 67437

[21] Appl. No.: 539,849

[22] Filed: Jun. 18, 1990

[51] Int. Cl.[5] .......................................... A47J 27/58
[52] U.S. Cl. .................................. 126/384; 126/385; 126/386; 126/373
[58] Field of Search ............... 126/384, 383, 385, 386, 126/373; 99/331, 413, 446; 220/4 C, 374

[56] References Cited

U.S. PATENT DOCUMENTS

| | | | |
|---|---|---|---|
| 1,264,348 | 4/1918 | Toth | 126/386 |
| 1,371,718 | 3/1921 | Zimmermann | 126/386 |
| 1,462,275 | 7/1923 | Gammel | 126/386 X |
| 1,766,797 | 6/1930 | Nakagawa | 126/385 |
| 2,061,533 | 11/1936 | Anetsberger | 126/390 X |
| 4,157,707 | 6/1979 | Schwind et al. | 126/386 |
| 4,509,412 | 4/1985 | Whittenburg | 126/369 X |

*Primary Examiner*—Larry Jones
*Attorney, Agent, or Firm*—Phillip A. Rein

[57] ABSTRACT

This invention relates to an overflow cooking pot assembly having a basic cooking pot assembly with 1) a main support pan member; 2) an intermediate lid member; and 3) a main outer lid member. The main support pan member is provided with a main support section integral with a fluid overflow section extending laterally and upwardly therefrom. The intermediate lid member is provided with vent slots to permit overheated fluid or food product to mvoe into the fluid overflow section for cooling thereof. Another embodiment of this invention includes the basic cooking pot assembly having a double boiler cooking pot assembly connected thereto. The double boiler cooking pot assembly includes a support and spacer member and a double boiler pan member. The support and spacer member is mountable within the main support pan member to receive the double boiler pan member mounted thereon to allow the heated liquids to flow therebetween. Another embodiment involves a fryer cooking pot assembly usable with the basic cooking pot assembly with the same spacer member and a screened fryer member. The support and spacer member allows the cooking oil to flow between the main support pan member and the screened fryer member. Another embodiment involves a food steamer cooking pot assembly having a food steamer member mountable on a support and spacer member for a food cooking steaming operation.

5 Claims, 2 Drawing Sheets

U.S. Patent     July 23, 1991     Sheet 1 of 2     5,033,453
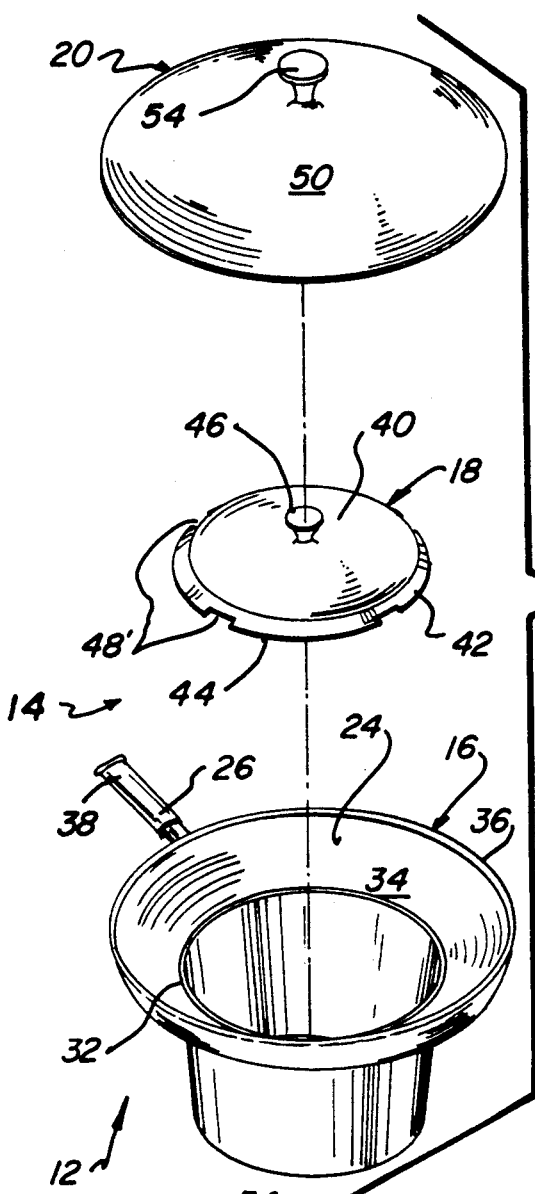
Fig_1
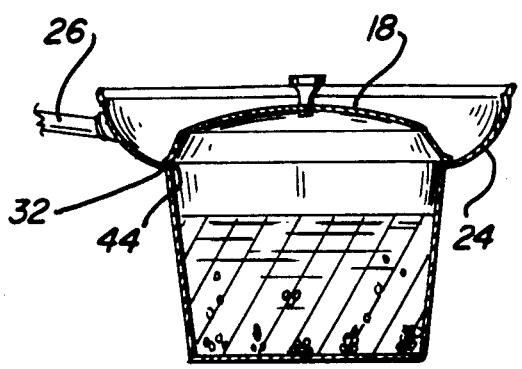
Fig_3
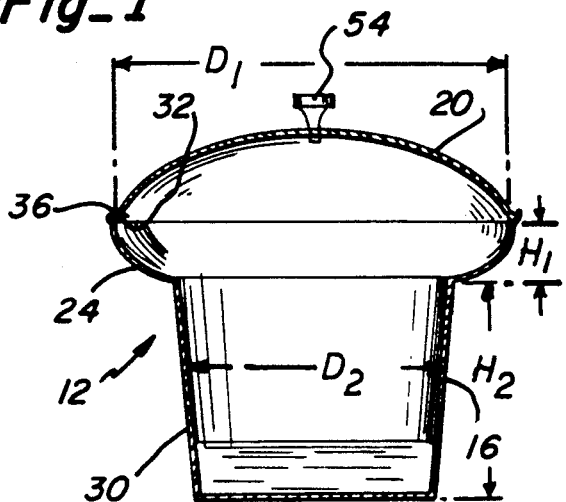
Fig_4
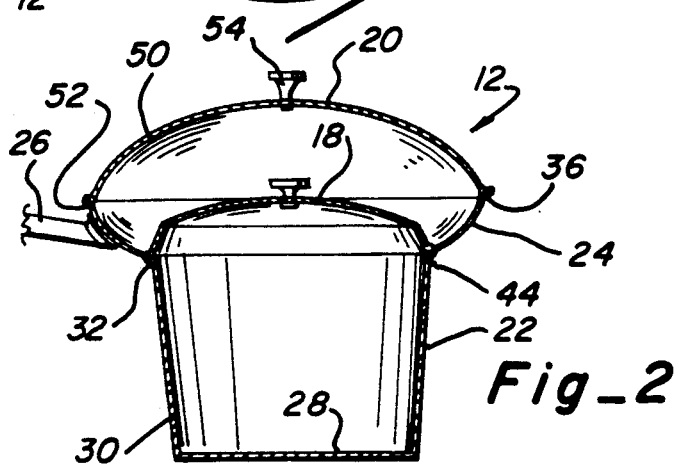
Fig_2

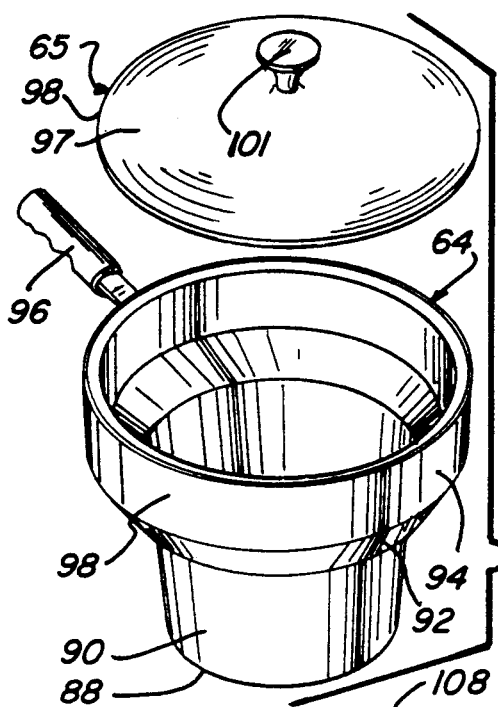
Fig_5
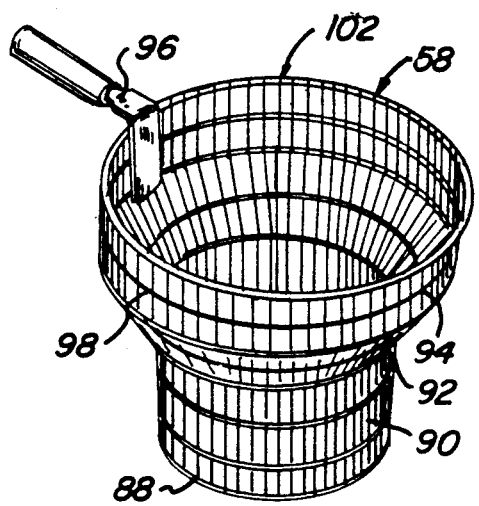
Fig_8
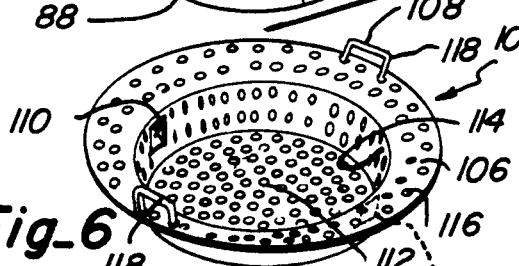
Fig_6
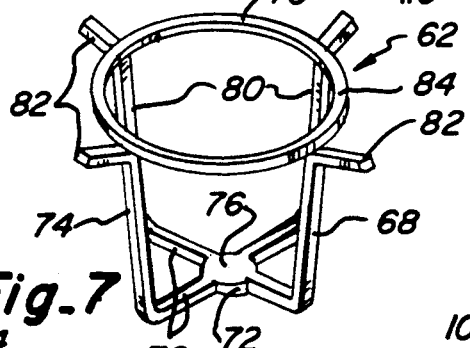
Fig_7
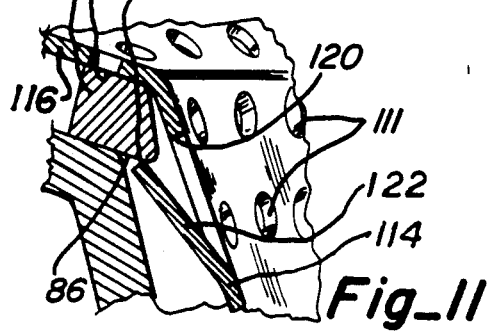
Fig_11
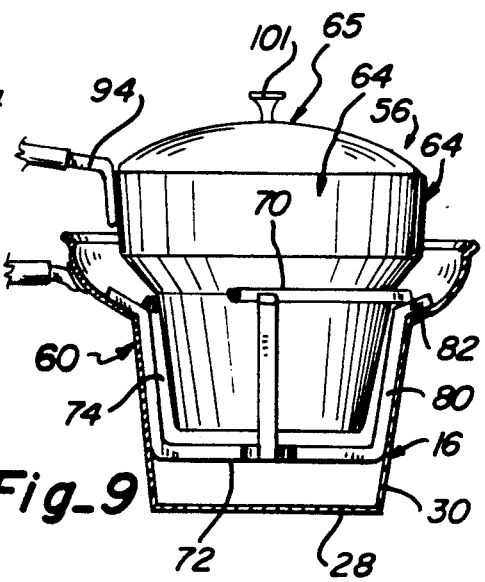
Fig_9
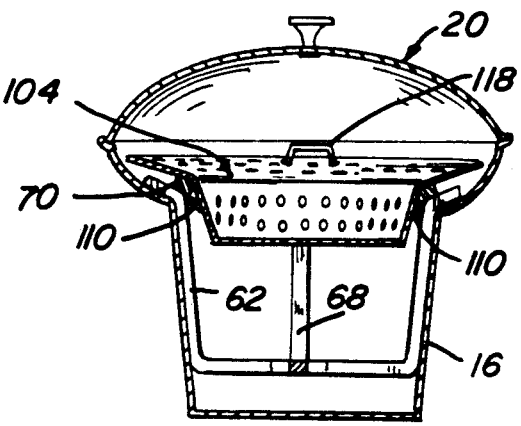
Fig_10

OVERFLOW COOKING POT ASSEMBLY

PRIOR ART

A patent search on the above identified invention was not conducted and specific knowledge of the prior art patents is unknown.

PREFERRED EMBODIMENT OF THE INVENTION

In one preferred embodiment of this invention, an overflow cooking pot assembly is provided having a basic cooking pot assembly including 1) a main support pan member; 2) an intermediate lid member to be placed within the main support pan member for sealing with an inner portion thereof; and 3) a main outer lid member to be mounted against a top surface of the main support pan member for sealing therewith. The main support pan member is provided with a main support section integral with a fluid overflow section and having a laterally extended handle member for grasping and lifting. The main support section includes a bottom wall integral with a integral side wall and having a lid support rim for sealing with the intermediate lid member. The fluid overflow section has an arcuate side wall that extends outwardly and upwardly from the lid support rim of the main support section to provide an area for expansion of steam and fluid therein to prevent overflow. The intermediate lid member is provided with a main body section having an outer seal lip section engagable with the lid support rim of the main support section of the main support pan member. The main body section is provided with a knob member for grasping and lifting plus fluid vent slots to allow the steam or fluid to flow into the fluid overflow section instead of overflow from the main support pan member. The main outer lid member is of a conventional nature having a main arcuate body section including a grasp knob member for grasping and lifting plus an outer lid seal section engagable with a top surface of the main support pan member in a conventional manner for a sealing function therewith. The basic cooking pot assembly includes other embodiments being 1) a double boiler cooking pot assembly; 2) a fryer cooking pot assembly; and 3) a food steamer cooking pot assembly. The double boiler cooking pot assembly includes a support and spacer member to be placed and supported within the main support pan member, a double boiler pan member operable to be supported on the support and spacer member, and a double boiler lid member mountable on the double boiler pan member. The support and spacer member is of square tubular construction, including in transverse cross section a main support frame having an upper top support rim secured thereto. The main support frame has a base member interconnected to spaced upright support arms. The top support ring includes an upper support surface to engage and support the double boiler pan member thereon. The upright support arms are engagable with a portion of the main support pan member in order to provide spacing therebetween for the free flow of steam and heated water. The double boiler pan member is operable to be placed within and supported on the support and spacer member mounted in the main support pan member and having the double boiler lid member mounted thereon in a sealing manner. The fryer cooking pot assembly includes the support and spacer member operable to receive and support a screened fryer member therein. The screened fryer member is substantially identical in size to the double boiler pan member except constructed of a screen material to allow the flow of hot liquid such as cooking oil therethrough for deep frying operations for fish, french fries, and the like. The food steamer cooking pot assembly includes the support and spacer member having a food steamer member mounted therein. The food steamer member therein includes a main basket member having upright handle members connected thereto and laterally extended connector members. The basket member has spaced holes for cooking purposes and includes a bottom wall portion integral with a tapered side wall portion which, in turn, is integral with an upper outwardly inclined lid wall portion. The handle members are of a conventional U-shaped nature operable to be grasped on opposite sides for ease of placing within or removed from the support and spacer member mounted within the main support pan member. The connector members are provided with laterally extended connector tabs which are engagable with the support and spacer member to releasably anchor the food steamer member therewithin during steaming operations but can be removed conjointly with the interconnected support and spacer member after cooking for liquid draining purposes.

OBJECTS OF THE INVENTION

One object of this invention is to provide an overflow cooking pot assembly having a new and novel main support pan resembling a conventional cooking pan structure but having an integral upper fluid overflow section providing an expanded area to prevent liquid and food products cooking therewithin from overflowing and spilling from the main support pan member.

Another object of this invention is to provide an overflow cooking pot assembly having a basic cooking pot assembly including 1) a main support pan member; 2) an intermediate lid member which can be mounted on an inner portion of the main support pan member to retain fluid and food therein; and 3) an outer main lid member mountable on an upper surface of the main support pan member to provide a seal therewithin.

One other object of this invention is to provide an overflow cooking pot assembly including 1) a main support pan member having a main support section integral with a fluid overflow section; 2) with a main outer lid member engagable with a top surface of the fluid overflow section for sealing purposes; and 3) the upper fluid overflow section extends laterally and upwardly from the main support section to provide an area of cooling to prevent food and liquid spillage and overflow therefrom.

One more object of this invention is to provide an overflow cooking pot assembly utilizing the main support pan member and a double boiler cooking pot assembly including 1) a support and spacer member mounted within the main support pan member; 2) a double boiler member mounted in the support and spacer member; and 3) a double boiler lid member mounted on the double boiler pan member to provide a double boiling operation and function.

One further object of this invention is to provide an overflow cooking pot assembly utilizing a fryer cooking pot assembly including a main screened fryer member mounted within a support and spacer member which, in turn, is mounted within a main support pan member whereby the screened fryer member is spaced inwardly from the main support pan member and provides a fryer cooking operation and function.

One additional object of this invention is to provide an embodiment of the fryer cooking pot assembly having 1) a main support pan member provided with an integral upper laterally extended fluid overflow section; 2) a support and spacer member mounted within the main support pan member to provide a spaced area therebetween; and 3) a screened fryer member mounted within the support and spacer member to a) prevent direct contact with an inner surface of the main support member; b) permit free flowing of heated cooking oil therebetween and into the screened fryer member for a cooking operation; and c) provides the fluid overflow section for a cooking function to prevent overflow of cooking oil therefrom.

Still, one other object of this invention is to provide an overflow cooking pot assembly having a main support pan member and utilized with a food steamer cooking pot assembly and including 1) a main support and spacer member mounted within the main support pan member; and 2) a food steamer member mounted on and releasably connected to the support and spacer member being operable to receive a food product therein for a steaming operation while maintaining a spaced relationship from adjacent side walls of the main support pan member to achieve the steaming operation and function.

Still, one further object of this invention is to provide an overflow cooking pot assembly which provides a fluid overflow section to prevent overheated fluid and food product contained therein from overflowing therefrom being economical to manufacture; easy to use; sturdy in construction; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is an exploded perspective view of an overflow cooking pot assembly of this invention illustrating a basic cooking pot assembly;

FIG. 2 is a fragmentary sectional view of the basic cooking pot assembly of this invention;

FIG. 3 is a fragmentary sectional view illustrating a combination of a main support pan member and an intermediate lid member of the basic cooking pot assembly of this invention;

FIG. 4 is a sectional view of the main support pan member and a main outer lid member of the basic cooking pot assembly of this invention;

FIG. 5 is an exploded perspective view of another embodiment of a double boiler cooking pot assembly of the overflow cooking pot assembly of this invention;

FIG. 6 is a perspective view of a food steamer member used with another embodiment including a food steamer cooking pot assembly of the overflow cooking pot assembly of this invention;

FIG. 7 is a perspective view of a support and spacer member utilized in the other embodiments of the overflow cooking pot assembly of this invention;

FIG. 8 is a perspective view of a screened fryer member utilized in the other embodiments of the overflow cooking pot assembly of this invention;

FIG. 9 is a fragmentary side elevational view with portions broken away of the double boiler cooking pot assembly of the overflow cooking pot assembly of this invention;

FIG. 10 is a side elevational sectional view of the food steamer cooking pot assembly of the overflow cooking pot assembly of this invention; and FIG. 11 is an enlarged fragmentary sectional view illustrating an inner connection of the support and spacer member; and the food steamer member of the overflow cooking pot assembly of this invention.

The following is a discussion and description of preferred specific embodiments of the overflow cooking pot assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, an overflow cooking pot assembly of this invention, indicated generally at 12, includes a basic cooking pot assembly 14, including 1) a main support pan member 16; 2) an intermediate lid member 18 to be mounted on an interior support surface of the main support pan member 16; and 3) a main outer lid member 20 to be engagable and seal with a top surface of the main support pan member 16 in a conventional manner.

The main support pan member 16 includes 1) a main support section 22; 2) a fluid overflow section 24 integral with an upper portion of the main support section 22; and 3) a handle member 26 connected to and extended laterally from the fluid overflow section 24.

The main support section 22 is of a conventional pan shape and includes 1) a bottom wall 28; 2) an outwardly and upwardly inclined side wall 30 integral with the bottom wall 28; and 3) an upper lid support rim 32 to receive the intermediate lid member 18 thereagainst in a manner to be explained.

The fluid overflow section 24 is of a curved shape extending laterally and upwardly from the lid support rim 32 of the main support pan member 16. The fluid overflow section 24 is a substantial distance from a heating source contacting the bottom wall 28 and provides a cooling function to overheated fluid and food product received in this area.

The handle member 26 extends laterally and is provided with an outer insulation cover portion 38.

The intermediate lid member 18 includes 1) a main body section 40 of arcuate dome shape; 2) an outer arcuate wall section 42 integral with the main body section 40; and 3) an upper knob member 46 for lifting and moving the intermediate lid member 18 which, in turn, is integral with a seal lip section 44.

The outer arcuate wall section 42 is provided with a plurality, namely, four equally spaced outer fluid vent slots 48 operable to allow movement of fluid, steam, and vapor therethrough to prevent a sealing action of the intermediate lid member 18 with the lid support rim 32 of the main support pan member 16 for reasons to be explained.

The main outer lid member 20 is of a conventional nature including 1) a main arcuate body section 50 of dome shape; 2) an outer seal lip section 52 integral with the body section 50 and engagable with the upper lid support rim 36 of the main support pan member 16; and 3) an upper grasp knob member 54 extended upwardly and centrally from the main arcuate body section 50.

The grasp knob member 54 is operable in a conventional nature for grasping and moving the entire main outer lid member 20.

One use of the basic cooking pot assembly 14 is illustrated in FIG. 2 whereupon both the intermediate lid member 18 and the main outer lid member 20 can be mounted on the main support pan member 16 for a steaming and cooking operation. This would allow the heat to be generated and contained into a smaller lower area for a faster cooking operation relative to a situation where the intermediate lid member 18 is not used as noted in FIG. 4.

Another use of the basic cooking pot assembly 14 is noted in FIG. 3 whereupon only the basic support pan member 16 and the intermediate lid member 18 are being utilized. Again, this provides a smaller cooking area but allows the excess steam, cooking fluid, and food product to escape through the fluid vent slots 48 into the fluid overflow section 24 for rapid cooling to prevent overflowing.

One other use of the basic cooking pot assembly 14 is illustrated in FIG. 4 whereupon the main support pan member 16 is utilized with the main outer lid member 20 for a conventional cooking operation except having the fluid overflow section 24 to provide the cooling function and prevent overflow.

Another embodiment of this invention is illustrated collectively in a combination of FIGS. 5, 7, and 9 being a double boiler cooking pot assembly 56 utilized with the basic cooking pot assembly 14. More particularly, the double boiler cooking pot assembly 56 includes 1) a support and spacer member 62 mountable within the main support pan member 16; 2) a double boiler pan member 64 operable to be mounted within and supported by the support and spacer member 62; and 3) a double boiler lid member 65 operable to seal with the double boiler pan member 64 in a conventional manner.

As best noted in FIG. 7, the support and spacer member 62 is constructed of a rod material being of square shape in transverse cross section and rigid construction. The support and spacer member 62 includes a main support frame 68 having a top support ring member 70 of circular shape secured thereto.

The main support frame 68 includes a base member 72 integral with a plurality of spaced upright support arms 74. The base member 72 includes a central support hub 76 having a plurality, namely four, equally spaced lateral support legs 78 extended therefrom.

The upright support arms 74 are individually connected to respective ones of the lateral support legs 78 and each includes an upright inclined support section 80 integral with an outer inclined support section 82. The lateral spacing of the outer inclined support sections 82 are such as to be supported on an inner upper surface of the arcuate side wall 34 of the fluid overflow section 24 of the main support pan member 16 as noted in FIGS. 9 and 10.

The top support ring member 70 is of a circular shape and irregular square shape in transverse cross section as noted in FIG. 11. The top support ring member 70 includes an upper support surface 84 for a support function and a lower clip anchor surface 86 for an anchor function as will be noted.

The double boiler pan member 64 includes 1) a bottom wall section 88; 2) a side wall section 90 integrally and upwardly extended from the bottom wall section 88; 3) a tapered overflow section 92 integral with the side wall section 90; 4) a main overflow section 94 integral with the tapered overflow section 92 and extended upwardly therefrom; and 5) a handle member 96. The main overflow section 94 is provided with an outer upright overflow side wall portion 98.

The handle member 96 is of a conventional nature used for lifting and conveying the double boiler pan member 64.

The double boiler lid member 65 includes an upper dome lid body portion 97 integral with an outer seal rim 98 and having an upper knob member 101 for grasping and movement thereof in a conventional manner. The outer seal rim 98 is operable to be used on a top surface of the double boiler pan member 64 in a conventional sealing manner.

In another embodiment of this invention, the fryer cooking pot assembly 58 is utilized with the basic cooking pot assembly 14 for a heated cooking oil operation for frying foods such as fish, chicken, french fries and the like.

The fryer cooking pot assembly 58 includes 1) the previously described support and spacer member 62 which is mountable within the main support pan member 16; and 2) a screened fryer member 102.

The screened fryer member 102 is identical in size to the double boiler pan member 64 except constructed of a screen material to hold a food product while allowing cooking oil to flow therethrough. The screened fryer member 102 includes 1) a bottom wall section 88; 2) a side wall section 90 integral with the bottom wall section 88; 3) a tapered wall section 92 integral with an upper surface of the side wall section 90; 4) a main upper section 94 integral with the tapered wall section 92; and 5) a handle member 96 extended laterally from the main upper section 94. The main upper section 94 is provided with a generally upright side wall portion 98.

It is noted that the screened fryer member 102 can replace the combination double boiler pan member 64 and double boiler lid member 65 in FIG. 9 for a hot cooking oil operation in a manner to be explained.

In one other embodiment of this invention, a food steamer cooking pot assembly 60 is utilized with the basic cooking pot assembly 14 in a food steaming and cooking operation as noted in FIG. 10. The food steamer cooking pot assembly 60 includes 1) the previously described support and spacer member 62 which is mountable within the main support pan member 16; 2) a food steamer member 104 mountable within the support and spacer member 62; and 3) the main outer lid member 20 which can be mounted on the main support pan member 16.

The food steamer member 104 is provided with 1) a basket member 106; 2) a handle assembly 108 connected to the basket member 106; and 3) connector members 110 which are an integral part of the basket member 106 for releasably connecting to the support and spacer member 62 in a manner to be explained.

The basket member 106 has a plurality of spaced holes 111 therein for allowing heated fluid and steam to flow therethrough and includes 1) a bottom wall portion 112; 2) a tapered side wall portion 114 integral with the bottom wall portion 112; 3) an inclined outer lip wall portion 116 integral with the tapered side wall portion 114 and extended laterally therefrom for reasons to be explained.

The handle assembly 108 includes two opposed spaced U-shaped handle sections 118 for use of grasping and moving.

The connector members 110 each include a clip cutout opening 120 from which connector tabs 122 are produced. Each connector tab 122 is provided with an outer upper contact surface 124 for engagement with the top support ring member 70 of the support and spacer member 62 in a manner to be explained.

USE AND OPERATION OF THE INVENTION

On referring to FIGS. 1-4, inclusive, the use and operation of the basic cooking pot assembly 14 of the overflow cooking pot assembly 12 of this invention, as illustrated in FIG. 3, shows the use of the main support pan member 16 having the intermediate lid member 18 mounted thereon. In this usage, the intermediate lid member 18 operates to enclose the lower main support section 22 to provide the smallest enclosed area of cooking. In this condition, when the fluid and food product therein has reached a boiling condition, it is understood that the fluid therein may flow upwardly and outwardly through the fluid vent slots 48 in the intermediate lid member 18. This will cause the cooking fluid and food product being cooked therein to flow through the fluid vent slots 48 into the fluid overflow section 24.

The fluid overflow section 24 has a substantial outer curved surface which is removed from contact with the heating elements engaged with the bottom wall 28 during a cooking operation. Therefore, the heated fluid and food product would move through the fluid vent slots 48 upwardly and within the fluid overflow section 24 to prevent discharge to the surrounding stove cooking area so that subsequent cleaning thereof would not be necessary.

The fluid overflow section 24 provides a substantially increased sectional area to achieve the cooling function of this invention. Assuming a cross sectional diameter (indicated at $D_1$) of the main support pan member 16 at the lid support rim 36 is 8 inches and a cross sectional diameter (indicated at $D_2$) of the fluid overflow section 24 at the lid support rim 36 is 12 inches, we calculate as follows:

$\pi = 3.1416$
R = radius inches
A = area of circle in square inches
$A_1$ = area of circle $D_1$
$A_2$ = area of circle $D_2$
$D_1$ = 8 inches diameter
$D_2$ = 12 inches diameter
$R_1$ = 4 inches
$R_2$ = 6 inches
$A_1 = \pi \times (R1)^2 = 3.1416 \times 16 = 50.27$ square inches
$A = \pi \times (R2)^2 = 3.1416 \times 36 = 113.10$ square inches Therefore, it is seen that the fluid overflow section 24 at a top surface contains 113.10 square inches of cooling surface area relative to 50.27 square inches at the top surface of the main support section 22. Or, $$\text{Percentage increase} = \frac{A_2}{A_1} = \frac{113.10}{50.27} = 225 - 100 = 125\%$$

The percentage increase on a situation of $D_1 = 8$ inches and $D_2 = 10$ inches having $A_1 = 50.27$ square inches and $A_2 = 78.57$ square inches would result as follows:

$$\text{Percentage increase} = \frac{A_2}{A_1} = \frac{78.57}{50.27} = 156 - 100 = 56\%$$

Therefore, any increase in cooling area caused by the use of the fluid overflow section 24 would be beneficial with a percentage increase of 50-125 percent per the examples being satisfactory with a median of 87.5 percent achieves ideal conditions.

The larger percentage of cooling area increase from a top surface of a normal cooking pan achieves the cooling action of the overflow cooking pot assembly 12 of this invention. Similar but different results will be found on relative variation of the diameters $D_1$ and $D_2$.

Further, the volume of fluid that may be contained in the fluid overflow section 24 relative to volume of fluid contained in the main support section 22 will determine the overflow prevention characteristics. For example, if a height of the fluid overflow section 24 is 2 inches as indicated at $H_1$ and a depth of the main support section 22 is 6 inches as indicated at $H_2$, the volume relationship is as follows:

V (Volume) = A (Area) × H (Height)
$V_1$ = Volume of fluid overflow section 34
$V_2$ = Volume of main support section 22
$A_1$ = area of circle D
$D_1$ = 12 inches diameter
$A_2$ = area of circle D
$D_2$ = 8 inches diameter
$A = \pi (R)^2$
$\pi = 3.1416$
$R_1$ = 5 inch radius (assume radius at 1 inch less due to curved surface)
$H_1$ = 2 inches
$R_2$ = 4 inch radius
$H_2$ = 6 inches
$V_2 = A_2 \times H_2 = (3.1416)(16) \times 6$
$V_2 = 301.62$ cubic inches
$V_1 = A_1 \times H_1 = (3.1416)(25) \times 2$
$V_1 = 157.08$ cubic inches $$\text{Percent Increase in Volume} = \frac{V_1}{V_2} = \frac{157.08}{301.62} = 52\%$$

Therefore, it is seen that the fluid overflow section 24 increases both the cross section area at 125 percent and volume 52 percent relative to a conventional cooking pan such as the main support section 22 to achieve the purpose of this invention to prevent overflow of overheated fluid and the food product contained therein.

In another use of the basic cooking pot assembly 14 as noted in FIG. 4, the main support pan member 16 is provided with the main outer lid member 20 mounted thereon. During a heating and cooking operation, any overheated fluid and food product will move upwardly to the fluid overflow section 24 to complete a cooling action to prevent discharge and overflow therefrom.

In the operation as noted in FIG. 2, the main support pan member 16 is utilized with both the intermediate lid member 18 and the main outer lid member 20. This combination operates with the main outer lid member 20 to hold the heat more generally therewithin as there are no exhaust vents between the main outer lid member 20 and the main support pan member 16. The intermediate lid member 18 retains heat in the main support section 22 but allows limited flow through the fluid vent slots 48. The vent slots 48 also allow any liquid formed above the intermediate lid member 18 to drain back into the main support section 22. This structure provides for the fluid overflow section 24 to accommodate a cooling of any overheated fluid and food product from the main support section 22 to prevent same from being discharged entirely from the basic cooking pot assembly 14 of this invention.

On referring to FIG. 9, this illustrates the use of the double boiler cooking pot assembly 56 with portions of the basic cooking pot assembly 14 to achieve a double boiling operation. More particularly, it is noted that the support and spacer member 62 is mounted within the main support pan member 16 with the outer inclined support sections 82 of the main support frame 68 resting on an upper adjacent surface of the fluid overflow section 24.

Next, the double boiler pan member 64 is placed within the support and spacer member 62. Additionally, the double boiler lid member 65 can be mounted on the double boiler pan member 64 to complete the assembly as noted in FIG. 9.

In a cooking operation of the double boiler cooking pot assembly 56, it is noted that the substantial thickness of the support and spacer member 62 allows for the cooking fluid such as water therein to circulate thereabout so as to heat the double boiler pan member 64 for a required double boiler cooking operation as found in the cooking of fudge, melting of marshmallows, and other similar operations.

In a deep frying cooking operation using the screened fryer member 102 illustrated in FIG. 8, it is obvious that the support and spacer member 62 would allow the heated cooking oil to boil and move through the wire mesh construction of the screened fryer member 102 for a cooking operation such as frying of chicken, fish, french fries, and the like.

In a food steamer operation of this invention to steam vegetables or the like, the food steamer cooker pot assembly 60 is utilized with a portion of the basic cooking pot assembly 14 in a manner as noted in FIG. 10. More specifically, the main support pan member 16 is provided having the support and spacer member 62 mounted therein similar to the previously described operation for deep frying and double boiler cooking operations.

Next, the food steamer member 104 is mounted within the support and spacer member 62 and, more specifically, is pressed downwardly so that the connector members 110 have the connector tabs 122 initially biased inwardly. The connector tabs 122 then spring outwardly for connection through the contact surface 124 to the lower clip anchor surface 86 of the top support ring member 70 of the support and spacer member 62 as noted in FIG. 11. This effectively interconnects the food steamer basket 104 and the support and spacer member 62 so that, on grasping the handle members 108 after a cooking operation, the entire interconnected structure is lifted upwardly and outwardly and can be placed in a sink or the like for draining operations while being supported in a sanitary manner by the support and spacer member 62.

The main support pan member 16 can be tilted while holding the main outer lid member 20 thereon to drain fluid therefrom after a steaming operation. Due to the close fit and depth of the support and spacer member 62 in the main support pan member 16, the support and spacer member 62 contacts an adjacent surface of the main support pan member 16 to keep from falling therefrom during the fluid draining step and while transferring cooked food product such as vegetables to a serving dish from the food steamer member 104. This important step is not achieved by using prior art food steaming operations and structures.

The food steamer member 104 has the side wall portion 114 at an angle of 20 degrees, plus or minus 5 degrees, relative to a vertical plane and the lip wall portion 116 is at an angle of 70 degrees, plus or minus 10 degrees, relative to the vertical plane. These angles result in the easy removal of the cooked food product from the food steamer member 104 on tilting of the main support pan member 116.

It is noted that the overflow cooking pot assembly of this invention can be utilized in numerous a basic cooking operations such as 1) using a basic cooking pot assembly having a cooking pan with a choice of lids mounted thereon; 2) in a double boiler cooking pot operation for double boiler operations such as melting marshmallows, cheese, and the like; 3) in a fryer cooking pot assembly operation and utilizing a screened fryer member for cooking french fries, chicken and fish in a frying manner; and 4) in a food steamer cooking operation utilizing a food steamer member so as to provide for the free flow of heated water and steam through food products for the cooking in a healthy and efficient manner.

The overflow cooking pot assembly of this invention is sturdy in construction; economical to manufacture; easy to use; valuable in multiple cooking function operations; and substantially maintenance free.

While the invention has been described in conjunction with preferred specific embodiments thereof, it will be understood this description is intended to illustrate and not to limit the scope of the invention, which is defined by the following claims.

I claim:

1. An overflow cooking pot assembly for heating fluids and food products operable to diminish the likelihood of overflow therefrom, comprising:
   a) a main support pan member including a main support section having a fluid overflow section integral with and extended upwardly and laterally of said main support section;
   b) a support and spacer member of a frame construction mounted within said main support pan member and vertically supported by contact with said fluid overflow section;
   c) a double boiler pan member mounted within said support and spacer member;
   d) a screened fryer member of a similar shape and dimension of said double boiler pan member except constructed of a screen material; and
   e) said screened fryer member operable to be placed within said support and spacer member which is supported by said main support pan member to achieve a fry cooking operation by the addition of cooking oil therewithin which would move freely between the inner surface of said main support pan member and said screened fryer member, and said fluid overflow section operates to cool down the heated cooking oil received therein to prevent an overflow from said main support pan member;
   whereby said support and spacer member operates to maintain a spacing between all sides and the bottom of said double boiler pan member to provide heated fluid therebetween to transfer heat applied to said main support section of said main support pan member to transfer same inwardly to said double boiler pan member for a double boiler cooking operation.

2. An overflow cooking assembly usable with a food steamer cooking pot assembly in order to heat fluids therewith for cooking food products by steam and operable to diminish the likelihood of overflow of the cooking fluid therefrom, comprising:
   a) a main support pan member including a main support section having a fluid overflow section connected thereto being extended upwardly and laterally of said main support section;
   b) a support and spacer member mounted within said main support section and supported on said fluid overflow section and operable to maintain spacing between inner walls of said main support pan section and any structure placed therein;
   c) a food steamer member mounted within said support and spacer member and having a plurality of holes therein to achieve a food steaming cooking operation of the food product contained therein;
   d) said support and spacer member includes a main support frame having a support top frame connected to a top portion thereof;
   e) said top support rim member having an upper support surface and a lower clip anchor surface; and
   f) said food steamer member is provided with connector members thereon which are releasably engagable and connected to said top support rim member so as to be movable conjointly therewith.

3. An overflow cooking pot assembly as described in claim 2, wherein:
   a) said food steamer member includes handle member;
   whereby said handle members can be grasped to move said food steamer member upwardly in conjoint movement with said support and spacer member for movement to a support area for draining purposes after cooking of the food products.

4. An overflow cooking pot assembly as described in claim 2, wherein:
   a) said food steamer member provided with a bottom wall portion, a tapered side wall portion integral with said bottom wall portion, and an inclined outer wall portion integral with said tapered side wall portion; and
   b) said inclined outer wall portion positioned adjacent to said fluid overflow section in a close spaced relationship thereto to prevent any fluid or food products from being expelled outwardly and falling downwardly into said main support section of said main support pan member.

5. An overflow cooking pot assembly as described in claim 2, wherein:
   a) said connector members include connector tabs which are moved inwardly to release contact with said top support rim for removing said food steamer member from engagement with said support and spacer member.

* * * * *